(12) United States Patent
Pizzato et al.

(10) Patent No.: US 12,553,570 B2
(45) Date of Patent: Feb. 17, 2026

(54) ELECTRONICALLY OPERATED ACTUATOR DEVICE FOR SAFETY ASSEMBLIES AND RELATIVE SAFETY ASSEMBLY

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 0 days.

(21) Appl. No.: 18/695,039

(22) PCT Filed: Sep. 23, 2022

(86) PCT No.: PCT/IB2022/059011
§ 371 (c)(1),
(2) Date: Mar. 25, 2024

(87) PCT Pub. No.: WO2023/047345
PCT Pub. Date: Mar. 30, 2023

(65) Prior Publication Data
US 2024/0410524 A1    Dec. 12, 2024

(30) Foreign Application Priority Data

Sep. 24, 2021 (IT) ......................... 102021000024598

(51) Int. Cl.
*F16P 3/08* (2006.01)
*H01H 27/00* (2006.01)

(52) U.S. Cl.
CPC ............. *F16P 3/08* (2013.01); *H01H 27/002* (2013.01)

(58) Field of Classification Search
CPC .............. F16P 3/08; F16P 3/00; H01H 27/002
See application file for complete search history.

(56) References Cited

U.S. PATENT DOCUMENTS

| | | | | |
|---|---|---|---|---|
| 2016/0260565 A1* | 9/2016 | Link | ...................... | H03K 17/97 |
| 2019/0316381 A1* | 10/2019 | Oh | ............................ | F16P 3/08 |
| 2020/0378154 A1* | 12/2020 | Wolfe | ................ | E05B 47/0003 |

* cited by examiner

*Primary Examiner* — Carlos Amaya
(74) *Attorney, Agent, or Firm* — Rivka Friedman (57) ABSTRACT

An electronically operated actuator device for safety assemblies comprises an anchoring body (2), anchoring means adapted to be removably inserted in said anchoring body (2), an actuator pin (3) projecting from the anchoring body (2) along a predetermined development axis (A) and having a first anchoring end (4) inside the anchoring body (2) and a second outer end (5) adapted to interact with a switching device following the approach of the actuator device. The actuator pin (3) is adapted to be oriented about the development axis (A) to be positioned according to at least two positions mutually rotated by 90° around said development axis (A), the anchoring body (2) being designed to block the rotation of the actuator pin (3) around the development axis (A), or to limit it to a value lower than 90°.

16 Claims, 8 Drawing Sheets

ELECTRONICALLY OPERATED ACTUATOR DEVICE FOR SAFETY ASSEMBLIES AND RELATIVE SAFETY ASSEMBLY

TECHNICAL FIELD

The present invention finds application in the field of electrical devices for industrial use and particularly deals with an actuator device designed to be associated with safety assemblies such as switches or safety sensors of the electronically operated type suitable for guarding accesses of perimeters or barriers of a machine or industrial plant or to be placed close to moving parts of a machine or plant.

The invention also relates to an electronically operated safety assembly, such as a safety switch or safety sensor, provided with the above actuator device.

STATE OF THE ART

Known safety assemblies such as safety switches or safety sensors designed to guard the accesses to machines or industrial plants, such as protection panels, barriers, safety perimeters, or moving parts of machines or systems, generally comprise a switching device suitable to be anchored to the fixed part of the access and an actuator device adapted to be anchored to the movable part.

The two switching and operating devices are adapted to interact with each other when the respective parts on which they are anchored move closer to send a signal or command to the machine or plant, the nature of which will depend on the function assigned to the specific safety device.

For example, in the case of safety switches, in a known manner, when the movable part is closed, the interaction between the switching device and the actuator device is produced, making it possible to start the machine or plant, unless there are no conditions that require the specific intervention of an operator.

On the contrary, the opening of the access or the request for opening, with consequent removal of the actuator device from the switching device, may cause the instantaneous or timed stop of the machine or plant to allow the access thereto in a safe condition.

The interaction between the two devices may be electromechanical or fully electronic. In the first case, the actuator device is usually provided with an actuator, generally key-shaped, which is inserted into a special slot in the switching device to interact with the switching means housed in the latter, according to known schemes.

An example of such an actuator is disclosed in DE19735859, wherein the actuator is provided with a cylindrical key element that project from a support element.

In electronically operated assemblies, on the other hand, the interaction between the two devices takes place by exchanging a presence signal between the two devices, suitably equipped with a remote communication system, usually of the tag/RFID type. In the most common, although not exclusive, embodiment, the actuator device may be provided with a first communication element of the transmitting type adapted to interact remotely with a second communication element of the receiving type housed in the switching device and adapted to communicate with the first communication element by means of the above presence signal.

The receiving element can be an antenna of the RFID (Radio Frequency Identification) type designed to receive a remote control signal transmitted by the transmitting element, which can instead be a transponder, when the latter is at the minimum detectable distance from the antenna.

In particular, the transponder may be provided with an RFID tag with an identification code that will be received by the receiving element and which must be recognized by the CPU that controls the safety assembly.

DE102010007388 describes an electronically operated safety switch provided with a key actuator housing an antenna thereinside to communicate with a position detector placed on the fixed part of the switch.

In particular, the actuator consists of a tip equipped with an antenna and a support element designed to be inserted inside a square-shaped fixing element that allows the actuator to be anchored to the door.

However, the particular geometry of the actuator and of the relative key-shaped pin does not allow to vary the orientation of the actuator pin with respect to the element that allows it to be fixed to the door, so that the actuator is not suitable for use either for hinged and sliding doors.

In fact, even if the particular geometry of the fixing element allows to insert the actuator inside it according to four different orientations angled 90° to each other and rotated with respect to an axis orthogonal to the fixing element itself, the final configuration of the actuator will always be the same and its final position will always be determined by the way the fastening member is anchored to the door.

Some configurations of electronic type actuators may also be equipped with a retaining and centering pin designed to fit into a special hole on the switching device and interact with a retaining mechanism present in the latter.

The pin has both the function of recovering any misalignments between the parts, to ensure that the two above communication elements are always aligned or in any case in such a position as to communicate with each other, and to avoid accidental opening of access due to vibrations or to other stresses that should be transmitted to the access and that would lead to an unwanted machine downtime.

Solutions are also known wherein the retaining and centering pin also operates as an electronic actuator, being provided at its end with the transponder or other transmitting or receiving communication element, to position itself, when it is inserted into the correspondent hole, near the tag or other receiving or transmitting communication element.

In designing these solutions, however, it must be considered that the positioning of the switching and operating devices on the respective anchoring parts is not unique, but depends both on the type of access, for example if hinged or sliding, and on the available spaces.

Therefore, it may be necessary to position one of the two parts in a rotated position with respect to the classic position, with the consequence that, if the other part could not undergo a similar rotation, the correct interaction between the communication elements may not be possible.

There is a solution on the market that provides for the use of a pin having the function of an electronic type actuator suitable to be rotated 90° to adapt to the specific position of the switching device and its remote communication element.

A first drawback of this configuration, however, is represented by the fact that the rotation of the pin with respect to its casing is made possible even during use, with the risk that it may accidentally rotate, no longer performing its function correctly.

Furthermore, the anchoring of the actuator device may only be carried out in the front position, limiting the methods of application of the device.

SCOPE OF THE INVENTION

The object of the present invention is to overcome the above drawbacks, providing an actuator device for safety assemblies for industrial machines and plants having features of high efficiency and relative cost effectiveness.

A particular object is to provide an actuator device for safety assemblies such as safety switches for access control, which has high flexibility of use, could be anchored according to different orientations and could also be anchored both frontally and laterally.

Still another object is to provide an actuator device for safety assemblies which is safe against accidental rotation of the actuator.

These objects, as well as others that will become more apparent hereinafter, are achieved by an actuator device for electronically operated safety assemblies which, according to claim 1, comprises an anchoring body adapted to be anchored to a fixed or movable part of the machine or plant or relative protection, anchoring means adapted to be removably inserted into said anchoring body for anchoring it to the fixed or movable part of the machine or system or protection thereof, an actuator pin that projects from said anchoring body along a predetermined development axis and having a first anchoring end inside said anchoring body and a second outer end adapted to interact with the switching device following the approach of the actuator device.

The actuator device is also provided with at least one remote communication element of the transmitting or receiving type adapted to communicate, by sending or receiving a presence signal, with a further communication element of the receiving or transmitting type associated with the switching device making up the safety assembly which the actuator device belongs to.

The actuator pin of the actuator device is made pivotable around said development axis to be positioned according to at least two positions mutually rotated by 90° around said development axis.

In this way, the orientation of the pin with respect to the anchoring body may be varied according to the needs, but only in the assembly phase of the actuator device, avoiding that there may be unwanted rotations during use.

Conveniently, the anchoring body will be designed at its inside to block the rotation of said actuator pin around said development axis, or to limit it to a value lower than 90°, when said anchoring means are inserted in said anchoring body for anchoring it.

In this way, the same anchoring means of the actuator device to the movable part of the access, such as screws, pins, rivets or the like, will prevent the rotation of the pin with respect to the anchoring body.

Advantageously, the anchoring body may comprise first and second anchoring means suitable for allowing selective anchoring to two mutually orthogonal walls.

For example, the anchoring body may be anchored to the relative support both frontally and laterally, according to the space available each time or according to the modalities with which the mutually movable parts of the protection or of the machine or plant approach each other.

Advantageous embodiments of the invention are obtained according to the dependent claims.

BRIEF DESCRIPTION OF THE DRAWINGS

Further features and advantages of the invention will become more apparent in light of the detailed description of a preferred but not exclusive embodiment of an actuator device for safety assemblies according to the invention, as well as of a safety assembly provided with the actuator device, shown below as non-limiting example with the aid of the attached drawing tables wherein.

BEST MODE OF CARRYING OUT THE INVENTION

With reference to the attached figures, a preferred but not exclusive configuration of an actuator device according to the invention is shown.

The actuator device, globally referred as 1, is designed to be part of a safety assembly for the control of industrial machines or plants or parts thereof, or of protections for industrial machines or plants, such as barriers or movable panels designed to prevent the unsafe access to a safety perimeter or other operating area where the machine or industrial plant is in action.

In a typical application, described in more detail below, the safety assembly may be a safety switch for monitoring accesses to safety perimeters and which will be equipped with a switching device suitable to be anchored to the fixed part of the protection, at an access thereof, to interact with the actuator device when the access is closed and interrupting, in an immediate or timed manner, the operation of the machine or system, or of one or more selected parts of the machine or system, following the opening of an access or even only in presence of a request for opening an access.

An alternative application could be that in which the safety assembly is a sensor suitable to detect the relative position of two or more mutually movable parts of the machine or plant or of the protection.

As more clearly shown in FIGS. 1, 2, and 4-8, the actuator device 1 comprises an anchoring body 2 to a fixed or movable part of the machine or plant or to the relative protection, not shown as known per se, depending on the type of safety assembly to which the actuator device 1 is designed to be associated.

The anchoring body 2 is provided with an actuator pin 3 which projects therefrom along a predetermined development axis A to interact with the switching device of the safety assembly.

In particular, the actuator pin 3 has a first anchoring end 4 inside the anchoring body 2 and a second outer end 5 adapted to interact with the switching device upon the approach between the actuator device and the switching device.

Therefore, development axis A means the axis that extends from the two ends 4, 5 of the pin 3 and along which the two ends 4, 5 will be mutually aligned.

Figure 1:
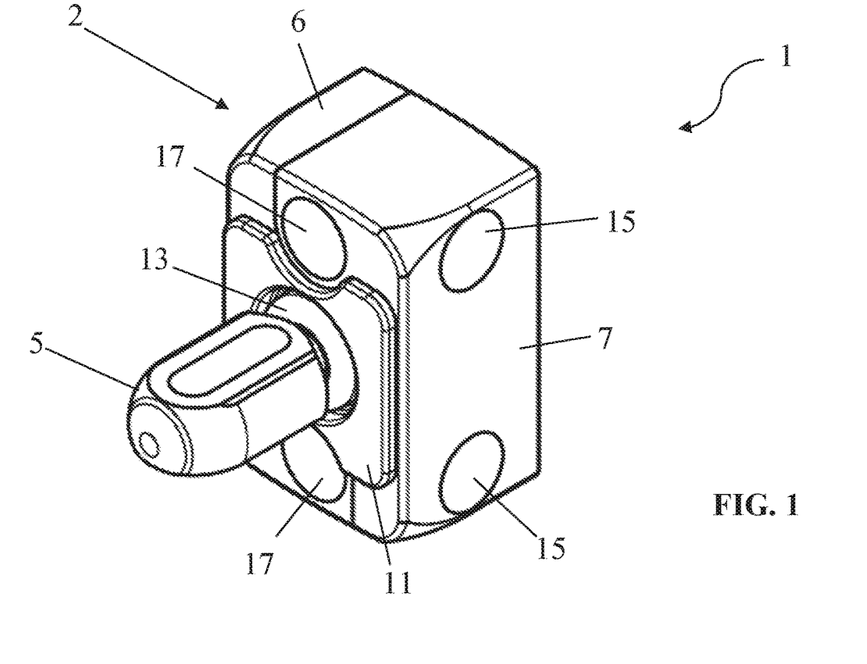
FIG. 1 is a perspective view of the actuator device in a first operating configuration.
Figure 2:
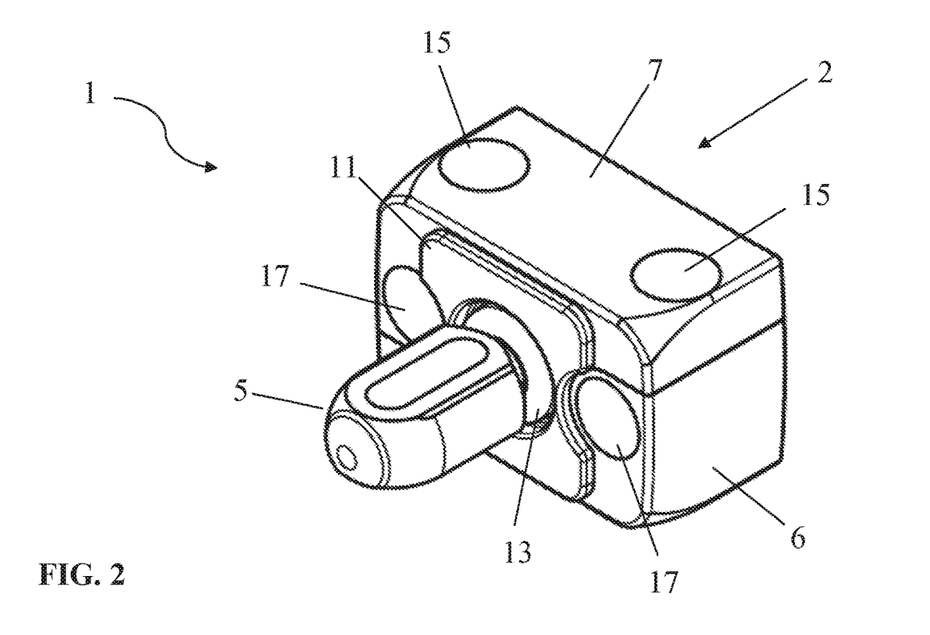
FIG. 2 is a perspective view of the actuator device in a second operating configuration.

The actuator pin 3 is arranged in the anchoring body 2 in an orientable way, being adapted to be rotated with respect to the anchoring body 2 about its development axis A to be positioned according to at least two positions mutually rotated by 90° about the development axis A.

The rotation of the actuator pin 3 will be a relative rotation with respect to the anchoring body 2, meaning that, in use, the actuator pin 3 may always hold the same orientation with respect to the part of the machine or plant, or to the relative protection, to which the actuator device 1 is anchored, in absence of relative rotation of the development axis A with respect to the anchoring body 2.

In this case, it will be the anchoring body 2 that, instead, will be effectively rotated with respect to the part of the machine or plant, or to the relative protection, to which the actuator device 1 is anchored.

The actuator pin 3 may optionally be rotated into four different positions, mutually angled by 90°.

Figure 3:
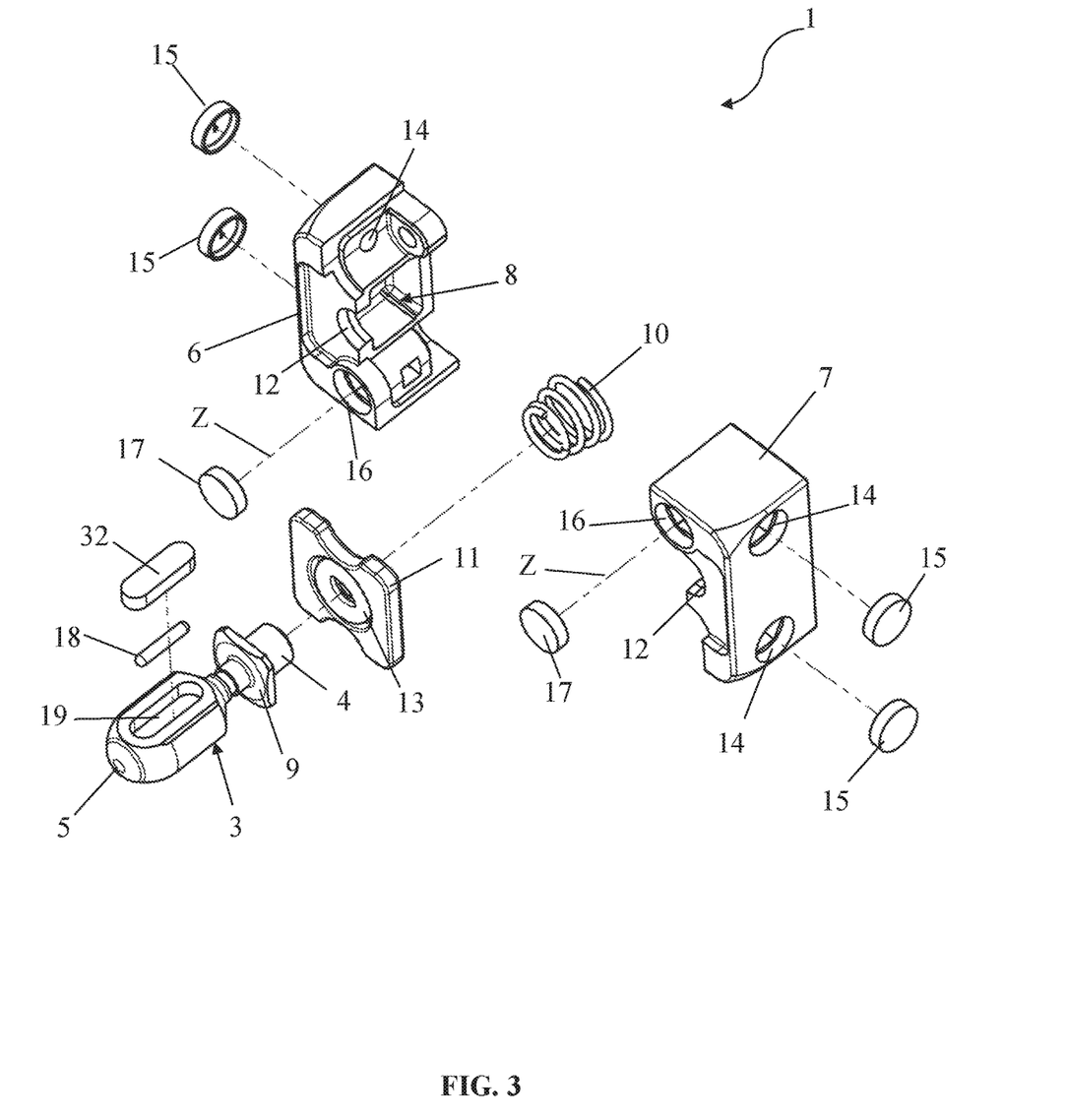
FIG. 3 is an exploded view of the actuator device.
Figure 4:
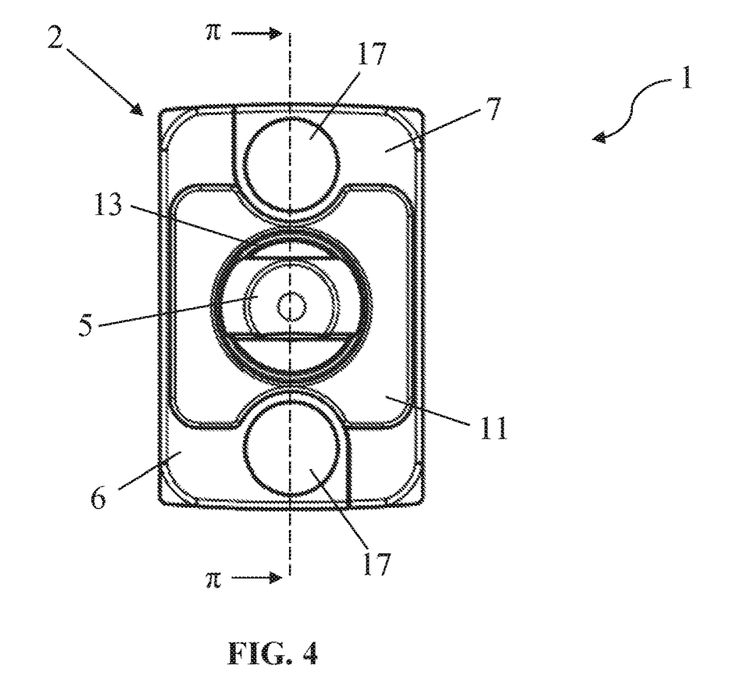
FIG. 4 is a front view of the actuator device of FIG. 1.
Figure 5:
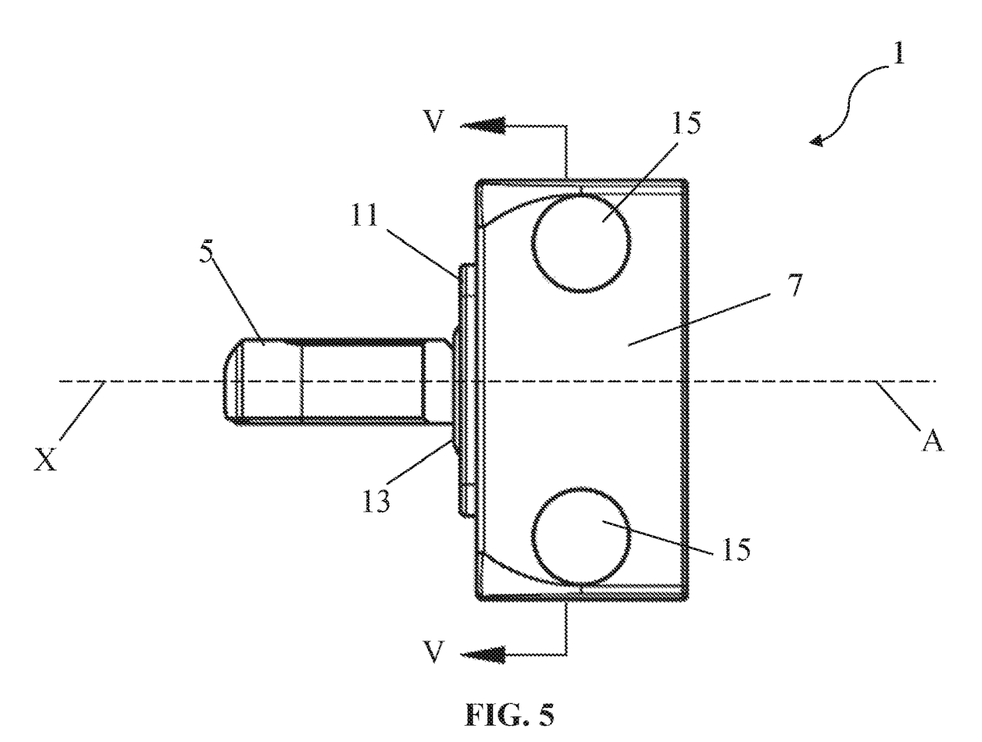
FIG. 5 is a side view of the actuator device of FIG. 1.
Figure 6:
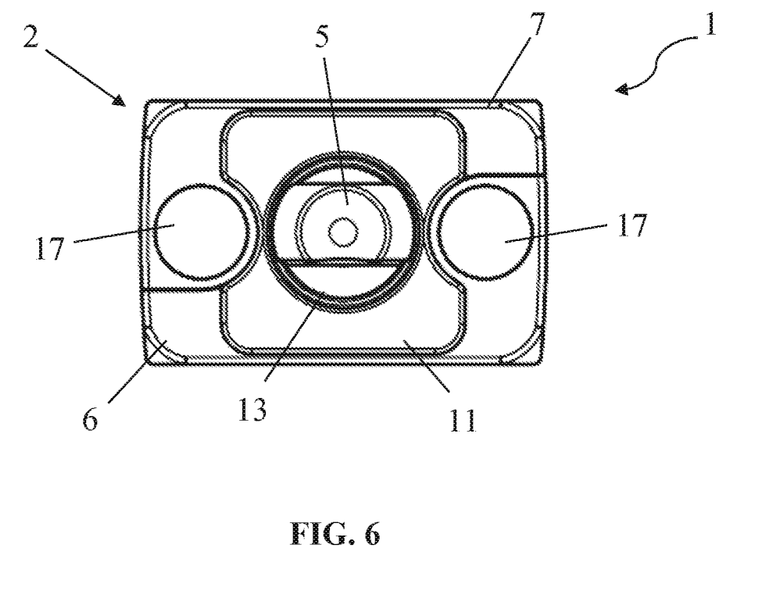
FIG. 6 is a front view of the actuator device of FIG. 2.
Figure 7:
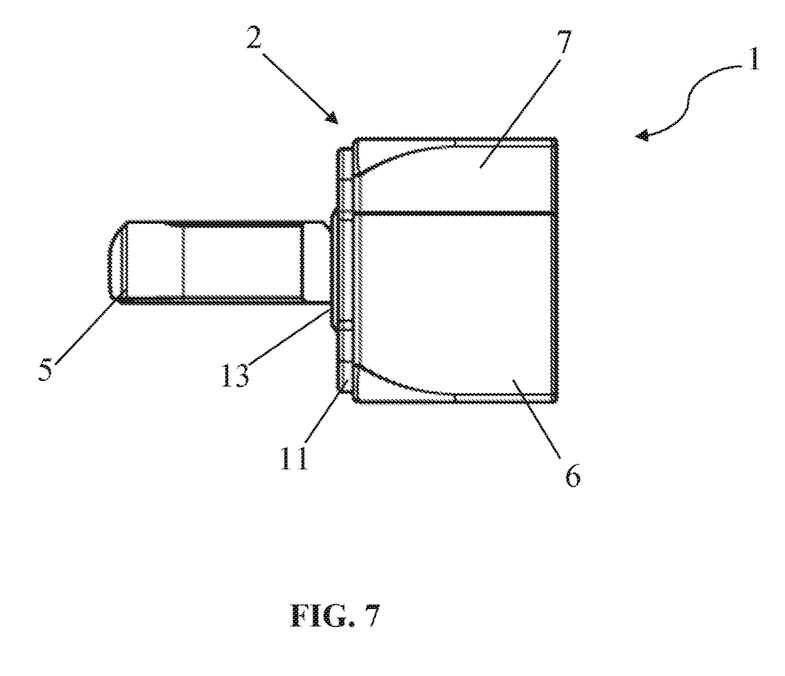
FIG. 7 is a side view of the actuator device of FIG. 2.
Figure 8:
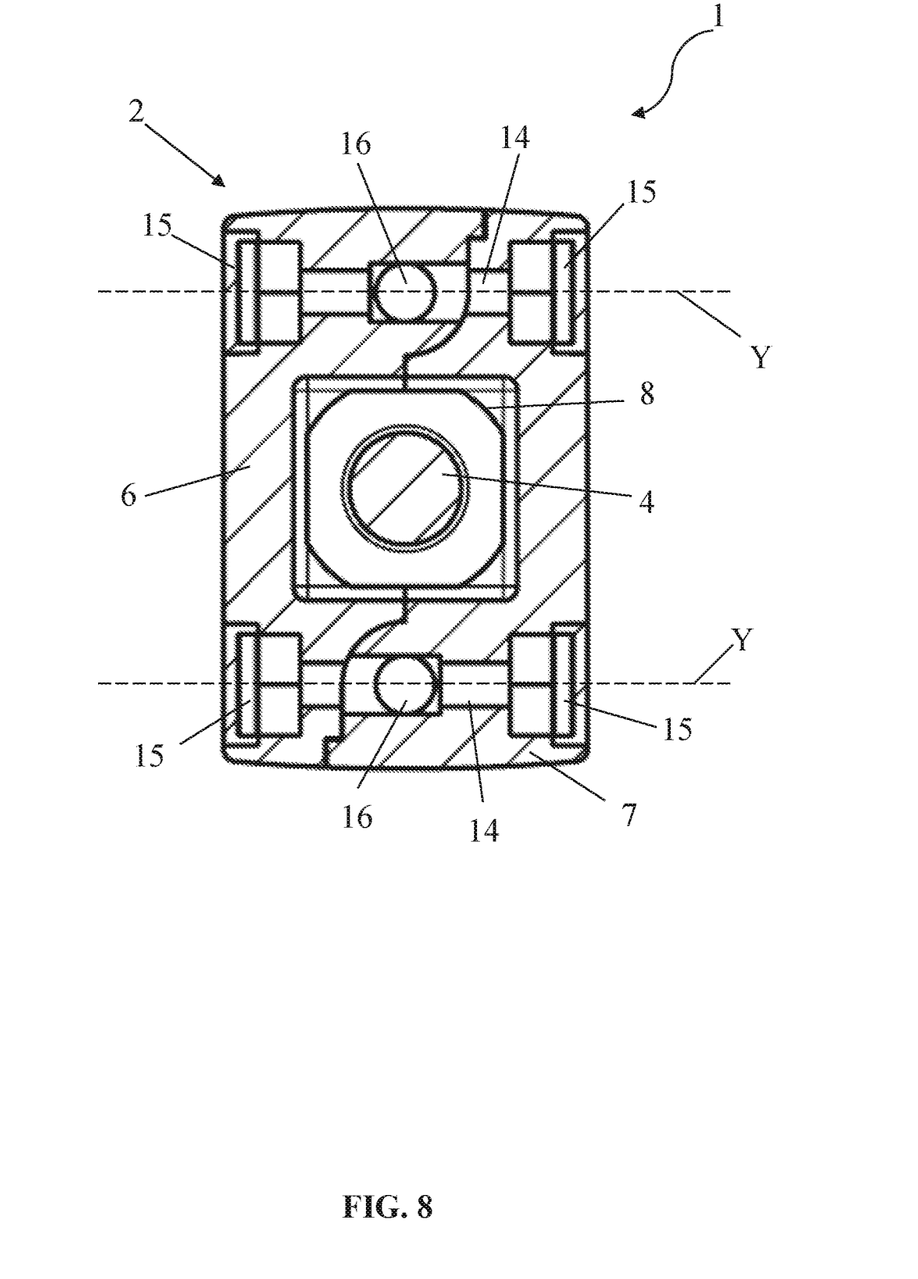
FIG. 8 is a sectioned front view of the actuator device of FIG. 1 according to the V-V trace plane of FIG. 5.

As visible from FIG. 3, the anchoring body 2 is provided with a shell formed by a pair of mutually coupled and internally shaped parts 6, 7 to define a housing seat 8 for the first anchoring end 4 of the actuator pin 3.

Preferably, but not necessarily, the shaped parts 6, 7 may be substantially identical to each other.

It is understood that the anchoring body 2 may consist of one or more parts designed to be assembled together to define the housing seat 8.

The latter is designed to block the rotation of the actuator pin 3, or at least to limit its rotation and prevent the complete rotation of 90°, around the development axis A when the shaped parts 6, 7 of the shell are assembled together, so that the complete relative rotation of 90° of the actuator pin 3 with respect to the anchoring body 2 may occur only when the shaped parts 6, 7 are at least partially separated from each other.

Once the actuator device 1 is anchored to the access by means of the appropriate anchoring means, described below, the shaped parts 6, 7 that make up the shell cannot be separated.

According to the preferred but not exclusive configuration of the figures, the first anchoring end 4 of the actuator pin 3 has a substantially cylindrical shape with a flange 9 substantially orthogonal to the development axis A and having a substantially quadrangular shape, possibly with beveled or rounded edges.

The flange 9 will be adapted to be inserted in the housing seat 8, having a front section of a shape substantially complementary to the flange 9, according to at least one pair of positions mutually rotated by 90°.

The complementarity in shape between the flange 9 and the housing seat 8, in the absence of a circular shape, will prevent the actuator pin 3 from rotating with respect to the anchoring body 2 when fully assembled or at least allow only a very limited rotation.

The actuator pin 3 may also have limited oscillation and rotation with respect to an axis X coinciding with the development axis A of the actuator pin 3 in the rest position, to allow the recovery of any misalignments between the switching device and the actuator device 1, as described more clearly below, which may occur during assembly or after use.

To this end, the presence of a spring or other elastic element 10 present inside the housing seat 8 to engage the cylindrical part of the first end 4 of the actuator pin 3 will allow the actuator pin 3 to remain articulated, always returning to the axially aligned position.

The anchoring body 2 may also have a front plate 11 provided with an elastomeric sheath 13 which will have the task of attenuating the impact suffered by the actuator pin 3, protecting the passage 12 also against possible entry of dirt or debris, which could compromise the correct possibility of articulation of the actuator pin 3.

According to a further particularly advantageous aspect of the invention, the anchoring body 2 comprises first and second anchoring means suitable for allowing the selective anchoring of the actuator device 1 to two mutually orthogonal walls of the part of the machine or plant, or of the relative protection, to which it must be anchored, based on the available spaces and the chosen operating methods. In addition, the first and second anchoring means are adapted to allow the selective anchoring of the actuator device 1 to the same surface of a wall according to two mutually orthogonal orientations, based on the available spaces and the selected operating modes.

In the preferred but not exclusive configuration illustrated, the first anchoring means comprise a pair of first through holes 14 made in the anchoring body 2, along a first direction Y transversal to the development axis A. It is understood that it will be possible to provide even more first holes or even a single first hole.

The first holes 14 will allow the insertion of respective fastening elements, such as screws, pins or the like, not shown, for laterally anchoring the actuator device 1.

Each first hole 14 may possibly be closed by a anti-tampering plug or seal 15, i.e. a plug or seal designed to give evidence of its removal.

The second anchoring means comprise a pair of second through holes 16 always made in the anchoring body 2 with their respective development axes in a plane $\pi$ parallel to the development axis A of the actuator pin 3 and orthogonal to the first transverse development direction Y of the first holes 14.

The two second holes 16 will allow the insertion of respective fastening elements, such as screws, pins or similar, also not shown, for the frontal anchoring of the actuator device 1.

In the illustrated embodiment, the two second holes 16 are placed with their respective centers on a plane $\pi$ which is also the plane of vertical symmetry of the anchoring body 2 passing through the development axis A of the actuator pin 3.

Also in this case, it is understood that it will be possible to provide several second holes or even a single second hole; moreover, each of the second holes 16 may be closed by a respective anti-tampering seal 17, i.e. a plug designed to give evidence of its removal.

Preferably but not exclusively, the first development direction Y of the first holes 14 will be orthogonal to the development axis A of the actuator pin 3, considered in the rest position.

The second holes 16 will instead develop along respective second directions Z parallel to the development axis A of the actuator pin 3, always in the rest position and, moreover, orthogonal to the first development directions Y.

The actuator device 1 according to the illustrated embodiment is adapted to be inserted in electronically operated safety assemblies, i.e. in assemblies wherein the interaction with the switching device occurs following the exchange of a presence signal between the two parts.

In this configuration, the actuator pin 3, in addition to being adapted to act as a retaining and centering element with respect to the switching device, also has the function of an actuator.

In particular, the actuator is provided with a first remote communication element 18 of the transmitting or receiving type adapted to communicate with a second communication element of the receiving or transmitting type present in the switching device by sending or receiving a presence signal, such as described below.

The first communication element 18 is housed in a recess 19 made in the second end 5 of the actuator pin 3 and may be closed again by a plug 32 or other sealing system, such as resin coating, gluing and the like.

According to a typical configuration for safety switches, the actuator pin 3 houses a first communication element 18 of the transmitting type adapted to interact remotely with a second communication element of the receiving type housed in the switching device and adapted to communicate with the first communication element 18 by means of the above presence signal, once the first communication element 18 will be at a minimum distance.

According to an alternative variant, the first remote communication element 18 housed in the actuator pin 3 may be of the receiving type to receive a presence signal sent by the second remote communication element, which will therefore be of the transmitting type.

According to a first embodiment, the element of the receiving type may be an antenna of the RFID (Radio Frequency Identification) type designed to receive a remote control signal transmitted by the element of the transmitting type, which may instead be a transponder, when the latter is at the minimum detectable distance from the antenna.

In particular, the transponder may be provided with an RFID tag with an identification code that will be received by the receiving element and which must be recognized by the control means of the safety assembly, suitably equipped with a CPU, in order to allow the starting of the machine or plant.

The code recognition may be unique or generic, depending on whether you want a switch with a high or low level of coding.

Advantageously, the RFID tag will be coded so that it may be uniquely recognized by the receiving element and prevent the use of actuators other than the one connected to the actuator device 1, avoiding the risk of unsafe access openings.

However, it is understood that the element of the transmitting type may also be of another type, for example with electromechanical action, such as a key actuator, or operating by means of sensors of the magnetic or electromagnetic, optical, mechanical, induction, pressure or similar type and consequently the receiving element will adapt to the nature of the transmitting element.

Figure 9:
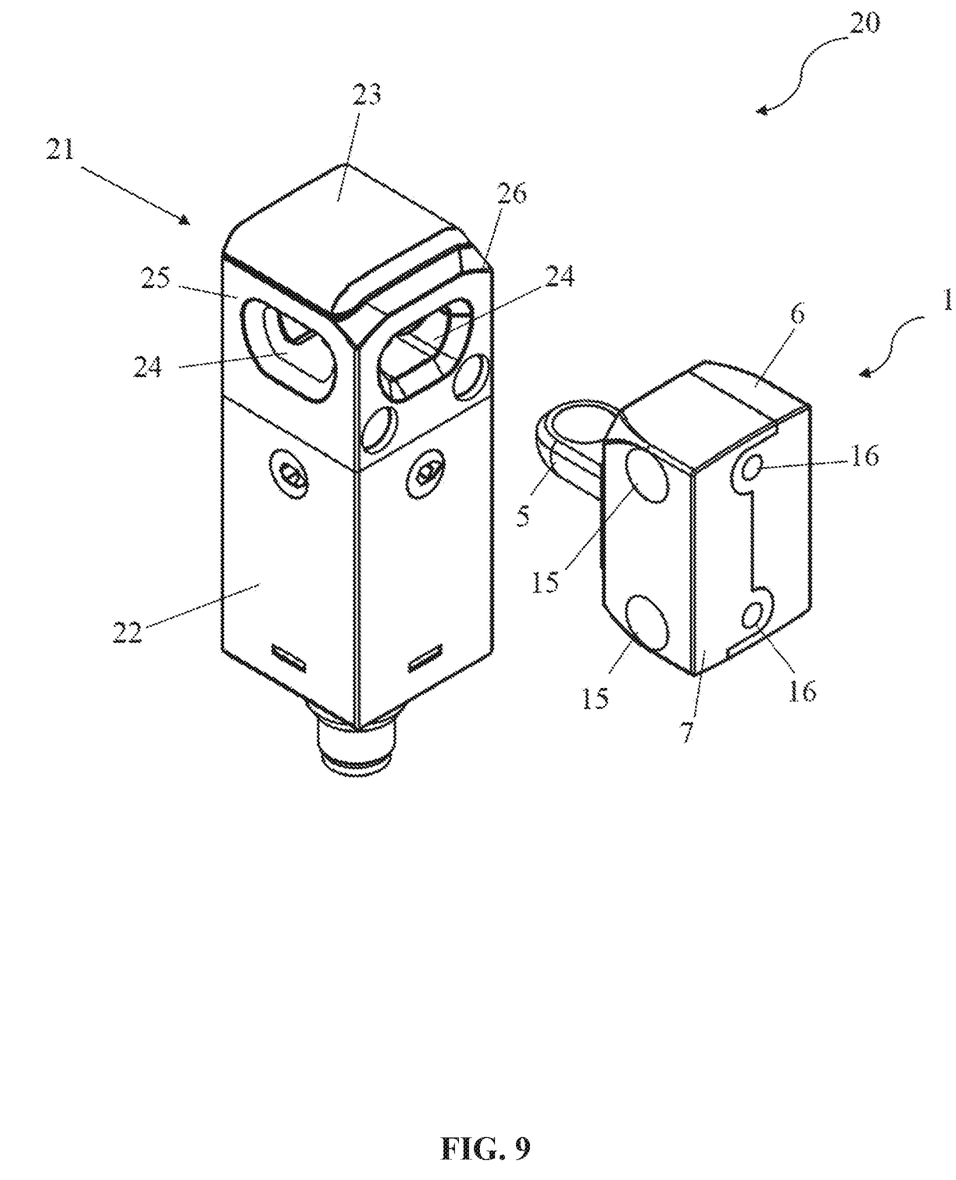
FIG. 9 is a perspective view of a safety assembly provided with the actuator device in a second variant and in the extracted position.

FIG. 9 shows a preferred but not exclusive application of the actuator device 1 within a safety assembly, globally indicated with 20.

In this configuration, the assembly 20 operates as a safety switch for controlling access to safety perimeters for industrial machines or plants.

In particular, the assembly 20 comprises a switching device 21 adapted to be anchored to a fixed part of the access to be controlled and an actuator device 1 adapted to be anchored to the movable part of the access.

The methods of anchoring the switching device 21 and of the actuator device 1 to the respective parts of the access are of a known type and are not part of the present invention.

The switching device 21 comprises a casing 22 housing thereinside switching means, not visible in the figures but with a per se known configuration, suitable for being operatively connected to one or more electric and/or electronic circuits for powering and/or controlling the main circuit and/or the service and emergency circuits of the machine or plant, always in a known manner.

The switching means may be selected from those commonly used in the field and may also vary depending on the functionality of the switch 20, without particular limitations.

The connection methods of the switching means will be selected from those typical for this type of product and they too will not be described in more detail below.

The casing 22 may also house control means, for example a microprocessor or CPU, not shown, suitable for receiving input signals from the control and/or service circuits through respective communication channels to verify their correct operation.

In this way, the control means may command the switching means to send an error signal and/or stop the plant in case of absence of a communication signal from one of the communication channels or in case of detection of non-conformity.

The casing 22 also comprises a top head 23 designed to interact with the actuator device 1 to allow the interaction of the latter with the switching means, according to the methods described below.

To this end, the head 23 will be provided with one or more slots 24 made in at least one of its front faces 25, 26 to allow the insertion of the actuator pin 3 inside it and the consequent interaction with the switching means.

Figure 10:
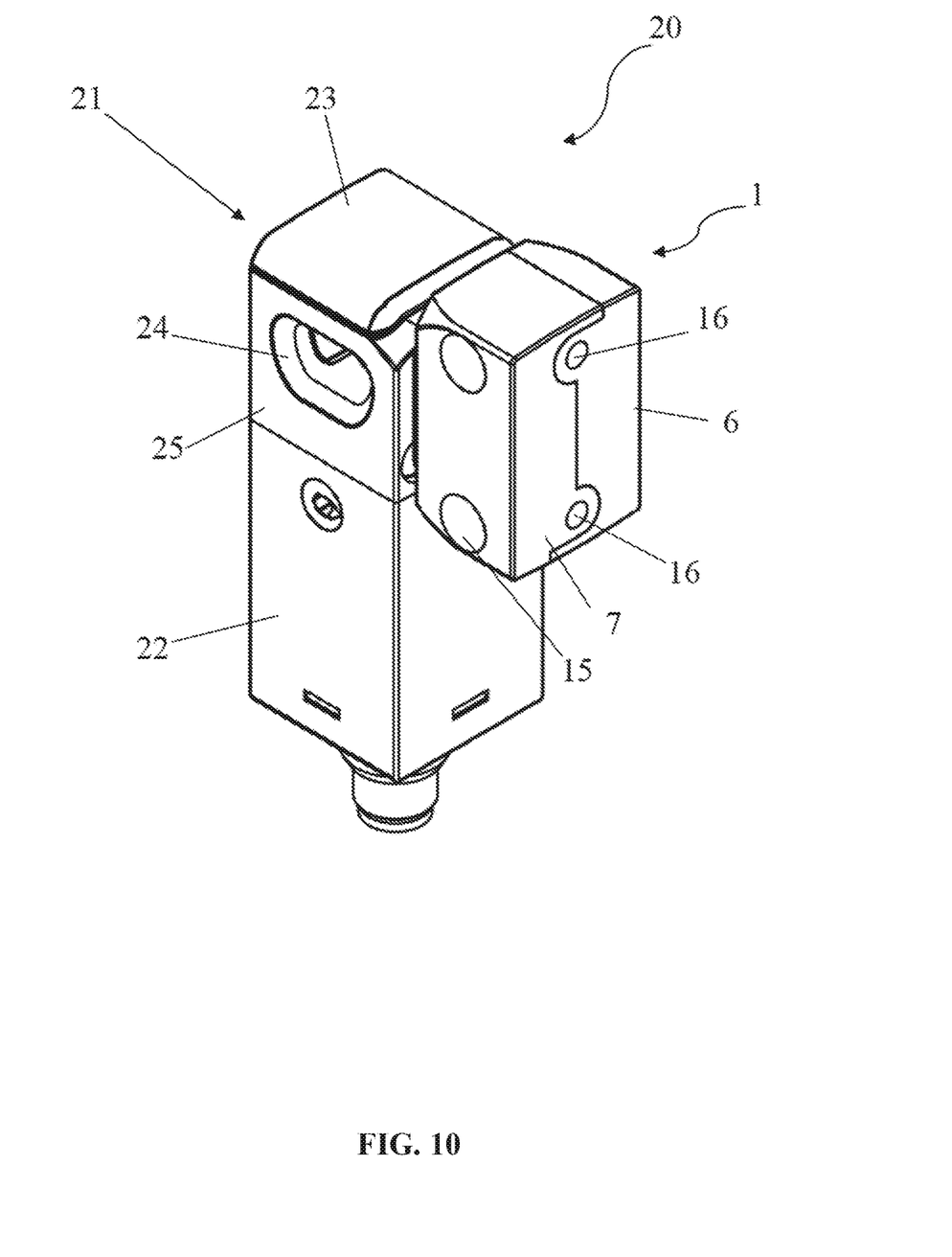
FIG. 10 is a perspective view of the safety assembly of FIG. 9 with the actuator device in the inserted position.

In FIG. 9 the switch 20 is represented in the open access condition wherein the actuator pin 3 is extracted from the head 23 while in FIG. 10 the switch 21 is shown in condition of access closed and not necessarily locked, wherein the actuator pin 3 is inserted into the head 23 through one of the slots 24.

In the preferred embodiment of the figures, the switch 21 will be of the electronically operated type, i.e. the interaction between the actuator device 1 and the switching means will be controlled by a remote electronic signal transmitted to the switching means by the actuator device 1 when this the latter is at a predetermined minimum distance from the switching device 21 such as to hold the access in closed and safe condition, by means of the interaction between the above first communication element 18 of the actuator pin 3 and a second remote communication element 28 housed in the head 23.

Figure 11:
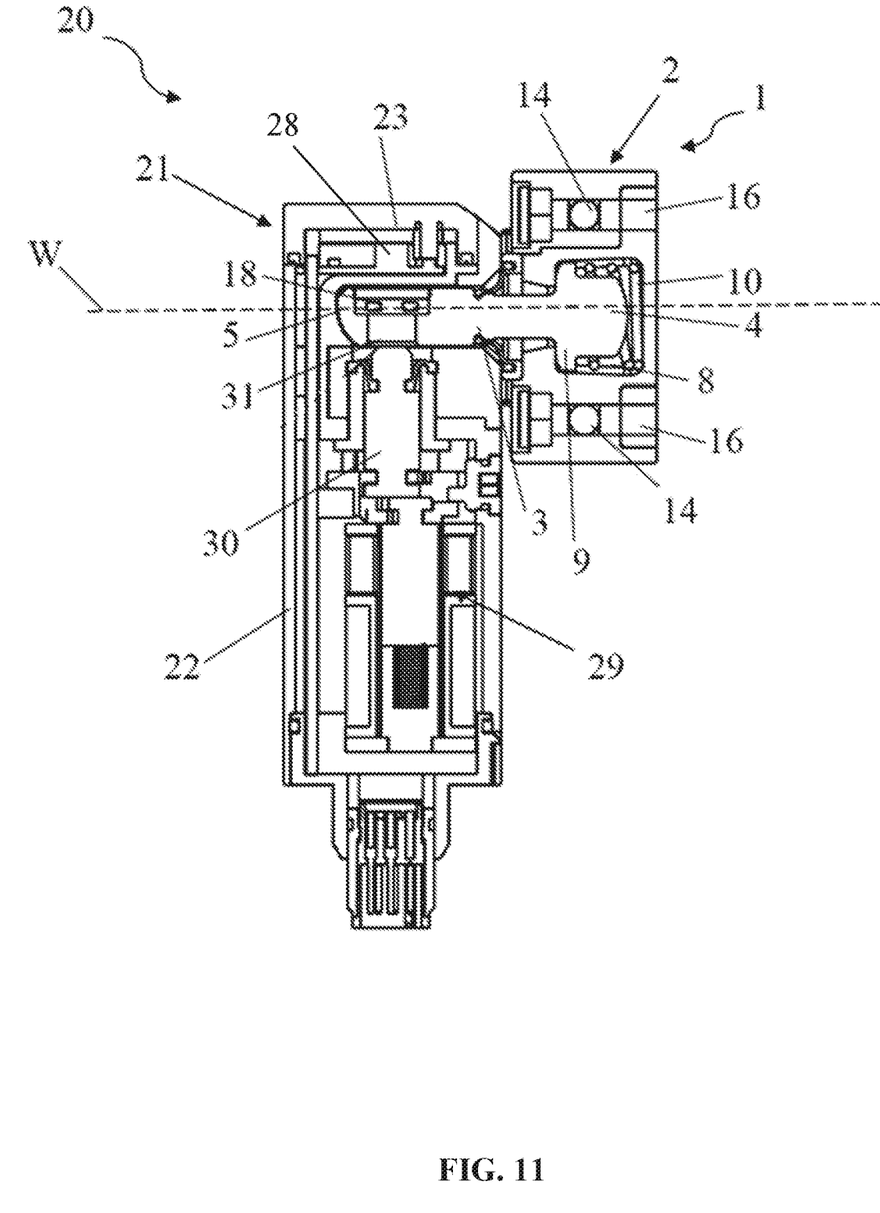
FIG. 11 is a sectioned side view of the safety assembly in the configuration of FIG. 10.

As visible from the section of FIG. 11, wherein the actuator device 1 has the actuator pin 3 inserted but not locked in the head 23 of the switching device 21, the casing 22 houses locking/unlocking means 29 of the actuator pin 3 provided with a locking pin movable along a vertical direction and orthogonal to the direction of insertion W of the actuator pin 3 inside the head 23.

The locking pin 30 will be designed to move between a raised access locking position, 30 wherein it engages the actuator pin 3 to retain it inside the head 23, and a lowered release position, wherein the actuator pin 3 is not engaged by the locking pin 30 and in correspondence with which the switching means will open.

In turn, the actuator pin 3 is provided with a recess 31 for the insertion of the upper end of the locking pin 30, which recess 31 will be arranged in such a position as to be aligned with the locking pin 30 when the actuator pin 3 is fully inserted into the head 23.

In this text, the expression "completely inserted" refers to a position of the actuator pin 3 inside the head 23 such as to allow the access to be considered properly closed.

The recess 31 may be defined by a concavity, or even by a hole, of suitable inlet diameter and made in the lower face of the second end 5 of the actuator pin 3 to allow at least partial insertion of the upper end of the release pin 30, such as to prevent the access from being opened when the locking/unlocking means 29 are in the locking configuration.

The first communication element 18 is placed above the recess 31, possibly incorporated in the second end 5 of the actuator pin 3, while the second communication element 28 will be arranged inside the head 23 to be aligned with the first communication element 18 when the actuator pin 3 is completely inserted in the head 23.

It is evident that in some situations of use the orientation of the second end 5 of the actuator pin 3 must be consistent with the orientation of the slot 24 in which it is to be inserted.

By way of example, the second end 5 of the actuator pin 3 may have a cross section that is not defined by a revolution around the development axis A. For example, to facilitate the housing of the communication element 18, the cross section of the second end 5 may substantially have the shape of a rectangle having one side larger than the other.

Furtherly, in some cases the position or type of communication element 18 may define a preferential communication direction for it. Therefore, the second end 5 must be suitably oriented to allow correct communication between the communication element 18 and a second communication element 28 of the switching device 21.

In such cases the advantages of the actuator according to the present invention are even more evident.

As matter of fact, the circumstance according to which the reciprocal rotation is allowed between the anchoring body 2 and the actuator pin 3 about the development axis A allows on the one hand to hold the orientation of the second end 5 consistent with that of the slot 24 and from the other side to easily and quickly adapt the position of the anchoring body 2 to the type of protection part to which it is to be anchored.

The operating modes of the switch are not described in more detail as they are of a per se known type.

From above it is apparent that the actuator device and the relative safety assembly according to the invention achieve the intended objects.

The invention claimed is:

1. An electronically operated actuator device for safety assemblies, wherein a safety assembly is adapted to be associated with a machine or industrial plant or to a protection thereof and comprises an electronically actuated switching device (21) provided with at least one remote communication element (28), the actuating device comprising:

an anchoring body (2) adapted to be anchored to a fixed or movable part of the machine or plant or of the relative protection;

anchoring means of said anchoring body (2) to the fixed or movable part of the machine or plant or of the relative protection, said anchoring means being adapted to be removably inserted in said anchoring body (2);

an actuator pin (3) projecting from said anchoring body (2) along a predetermined development axis (A) and having a first anchoring end (4) inside said anchoring body (2) and a second outer end (5) adapted to interact with the switching device following the approach of the actuator device; and at least one remote communication element (18) adapted to communicate with the communication element (28) of the switching device (21) by sending or receiving a presence signal;

wherein said actuator pin (3) is adapted to be oriented with respect to said anchoring body (2) about said development axis (A) to be positioned according to at least two positions mutually rotated by 90° around said development axis (A).

2. The device as claimed in claim 1, wherein said anchoring body (2) is designed at its inside to block the rotation of said actuator pin (3) around said development axis (A), or to limit the rotation to a value lower than 90°, when said anchoring means are inserted in said anchoring body (2) for the anchoring of said anchoring body (2).

3. The device as claimed in claim 2, wherein said remote communication element (18) is placed inside said actuator pin (3).

4. The device as claimed in claim 3, wherein said remote communication element (18) is housed in a recess (19) made in said second end (5) of said actuator pin (3).

5. The device as claimed in claim 1, wherein said first end (4) of said actuator pin (3) comprises a flange (9) substantially orthogonal to said development axis (A) and having a substantially quadrangular shape, said flange (9) being adapted to be inserted in said anchoring body (2) according to at least one pair of positions mutually rotated by 90°.

6. The device as claimed in claim 1, wherein said anchoring body (2) comprises first and second anchoring means suitable for allowing selective anchoring to two mutually orthogonal walls.

7. The device as claimed in claim 6, wherein said first anchoring means comprise at least one first through hole (14) which pass through said anchoring body (2) along a first transverse direction (Y) transversal to said development axis (A).

8. The device as claimed in claim 6, wherein said first transverse direction (Y) of said at least one first hole (14) is orthogonal to said development axis (A).

9. The device as claimed in claim 8, wherein said second anchoring means comprise at least one second through hole (16) made in said anchoring body (2) in a plane ($\pi$) parallel to said development axis (A) and orthogonal to the first transverse development direction (Y) of said at least one first hole (14).

10. The device as claimed in claim 9, wherein said second through holes (16) extend along respective second directions (Z) parallel to said development axis (A).

11. The device as claimed in claim 10, wherein said first direction (Y) and said second direction (Z) are mutually orthogonal.

12. The device as claimed in claim 5, wherein said anchoring body (2) comprises a shell composed of one or more internally shaped parts (6, 7) to define a housing seat (8) for said first end (4) of said actuator pin (3), said housing seat (8) being designed to block the rotation of said actuator pin (3) about said development axis (A), or to limit the rotation of said actuator pin (3) about said development axis (A) to a value lower than 90°, when said shaped parts (6, 7) of said shell are assembled together.

13. The device as claimed in claim 12, wherein said housing seat (8) has a front section of a shape substantially complementary to said flange (9), according to at least one pair of positions mutually rotated by 90°.

14. The device as claimed in claim 13, wherein said second anchoring means comprise a second through hole (16) made in one of said shaped parts (6) of said shell and a further second through hole (16) made in the other of said shaped parts (7) of said shell.

15. An electronically operated safety assembly, comprising:
- an actuator device (1) according to claim 1 designed to be anchored to the movable or fixed part of the access to be controlled and provided with at least one first remote communication element (18);
- a switching device (21) adapted to be anchored to the fixed or movable part of an access to be controlled and provided with at least one second remote communication element (28) suitable to communicate, upon the closure of said access, with said first communication element (18) by sending or receiving a presence signal.

16. The device as claimed in claim 6, wherein said first anchoring means comprise at least one first pair of through holes (14) passing through said anchoring body (2) along a first transverse direction (Y) transversal to said development axis (A).

* * * * *